UNITED STATES PATENT OFFICE.

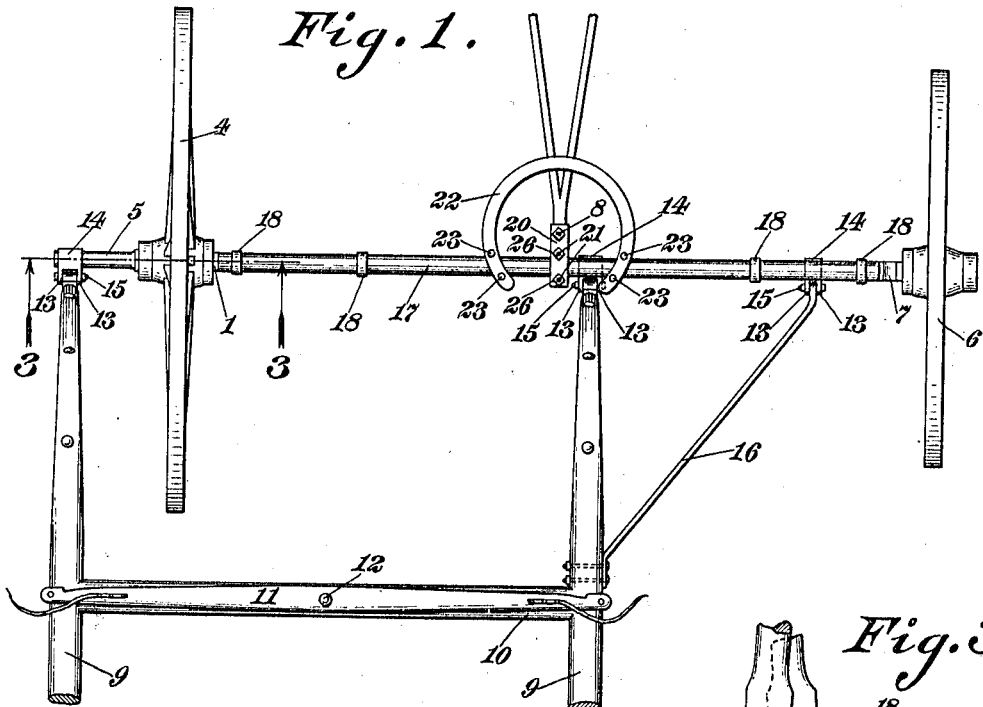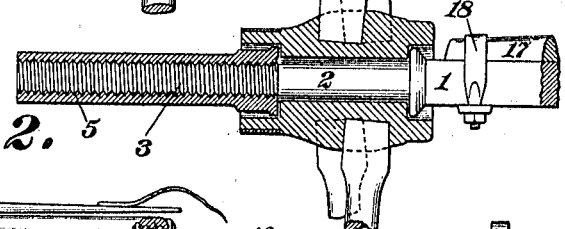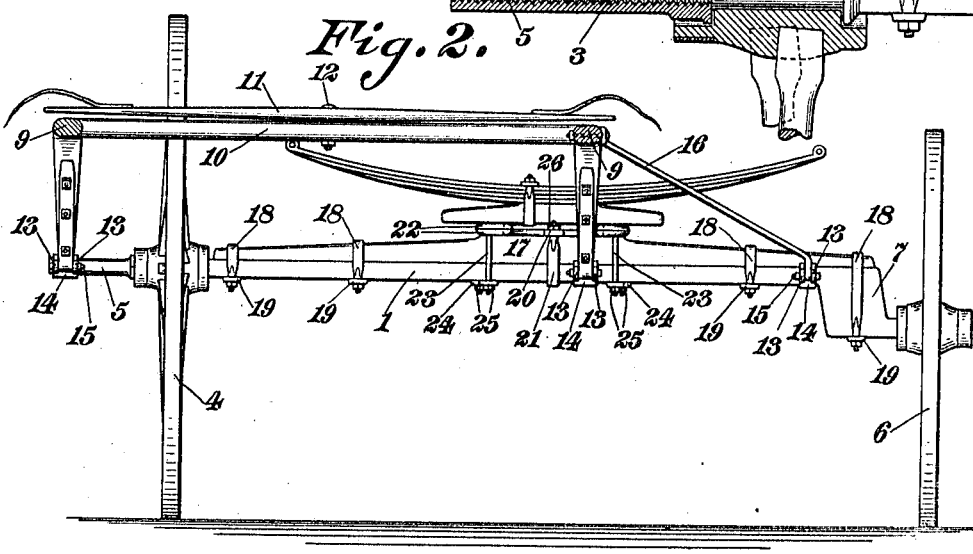

HENRY GOOSENS, OF COLUMBIA, ILLINOIS.

SIDE-TRACK-DRAFT ATTACHMENT FOR VEHICLES.

1,040,930. Specification of Letters Patent. Patented Oct. 8, 1912.

Application filed March 18, 1912. Serial No. 684,456.

*To all whom it may concern:*

Be it known that I, HENRY GOOSENS, a citizen of the United States, residing at the town of Columbia, in the county of Monroe and State of Illinois, have invented certain new and useful Improvements in Side-Track-Draft Attachments for Vehicles, of which the following is a specification.

This invention relates to one-horse vehicles and has for its primary object to provide a side-track draft attachment therefor, so that the animal can travel in one of the side-tracks formed by the passage of two-horse teams over the road and, at the same time, will draw the vehicle so that the wheels of same will travel in the usual wheel-tracks in the road.

Another object of this invention is to provide a side-track draft attachment for one-horse vehicles that can be readily attached to a buggy, carriage, wagon, or the like, and that will cause the front wheels of the vehicle to travel substantially abreast of each other, instead of one wheel traveling in advance of the other as is usually the result when devices of this character heretofore constructed are used.

Further, the present invention consists of novel features of construction and arrangement of parts as will be hereinafter more fully described and pointed out in the claims.

In the accompanying drawings forming part of this specification, in which like numbers of reference denote like parts wherever they occur, Figure 1 is a top plan view of my improved side-track draft attachment; Fig. 2 is a front view of same; and Fig. 3 is a sectional view, on an enlarged scale, on the line 3—3, Fig. 1.

The front axle 1 is preferably formed with a rectangular cross-sectional configuration and is made substantially horizontal instead of being arched as in the usual construction. The spindle 2 at one end of the axle 1, preferably the end adjacent the side of the vehicle on which the driver usually sits, is preferably made cylindrical and is provided with an elongated screw-threaded extension 3 which projects beyond the hub of the wheel 4, an elongated nut 5 being fitted on said screw-threaded extension, in order to hold the wheel 4 in place on said spindle, and, also, to cover substantially the whole of said screw-threaded extension, as best seen in Fig. 3. A wheel 6 is mounted on the spindle borne by the other end of the axle 1 and is held in place thereon by the usual means. Said wheel 6 is made smaller in diameter than the wheel 4 for the purpose hereinafter described, and, for this reason, the axle 1 is offset at 7, as best seen in Fig. 2, so that said axle will be substantially horizontal, said offset being enlarged or weighted by any suitable means, so that the weight of the wheel 6 and part of the axle on one side of the kingbolt 8 counterbalances the weight of the wheel 4 and the part of the axle on the other side of said king-bolt, so as to prevent the vehicle from turning over.

The shafts 9 are connected by the usual cross-bar 10, on which the swingletree 11 is pivotally attached at 12, and are so positioned that the center line thereof is intermediate the wheel 4 and the king-bolt 8, so that the animal will be located in front of the driver and will travel in one of the side-tracks in the road, while at the same time the wheels of the vehicle will travel in the usual wheel-tracks in the road. One of the shafts 9 is located upon the outer side of the wheel 4 and has its rear end pivotally attached to the ears 13 of a clamp 14 by means of a bolt 15 or the like, said clamp being secured to the elongated nut 5 by any suitable means at the end thereof. The other shaft 9 is located intermediate the wheels 4 and 6 and has its rear end pivotally attached to the ears 13 of another clamp 14 by means of a bolt 15 or the like, said clamp being preferably located at a point near the king-bolt 8 and intermediate said king-bolt and wheel 6.

A rod 16 is bolted or otherwise secured at one end thereof to the shaft 9 that is located intermediate the wheels 4 and 6, and the other end of said rod is pivotally attached to the ears 13 of a third clamp 14 by means of a bolt 15, which clamp is secured to the axle 1 by any suitable means. The rod 16 acts as a brace for the shafts 9, when the vehicle is turned toward one side, and also, as a tie-rod, when the vehicle is turned toward the other side, and thereby lessens the strain on the particular bolts 15 which attach said shafts to the clamps 14. Said axle 1 is preferably formed of iron, steel, or any other suitable metal. An auxiliary axle or member 17, which is preferably formed of wood, is supported on the upper side of axle 1 and is detachably secured thereto by means of U-bolts 18 and plates 19, being preferably arranged to extend longitudinally of said axle 1 from a point near the hub of wheel 4 to the offset 7. The king-bolt 8 is supported in the usual manner by the frame of the vehicle, and passes through an opening in a plate 20, the latter being detachably secured on the auxiliary axle 17 by means of a U-bolt 21 which embraces both axles 1 and 17. The lower member 22 of the fifth wheel rests on the auxiliary axle 17 and is detachably secured thereto by means of two pairs of bolts 23 which have their heads countersunk in said lower member so as to allow the upper member 22 of the fifth wheel to pass smoothly over said lower member. The bolts 23 of each pair pass through openings in the lower member 22, on opposite sides of the auxiliary axle 17, and, also, through openings in a plate 24 which is held firmly against the lower side of the axle 1 by means of the nuts 25. The upper member 22 of the fifth wheel rests upon the lower member 22 and is secured in the usual manner to the frame of the vehicle. The nuts 26 on the U-bolt 21 hold the plate 20 firmly in place on the auxiliary axle 17 and the nuts 25 on the bolts 23 hold the lower member 22 of the fifth wheel firmly in place on said auxiliary axle. When, however, it is desired to detach the device from the vehicle, the nuts 25 and 26 are removed from the bolts 23 and 21, respectively, thereby disconnecting the auxiliary axle 17 and axle 1 from the fifth wheel and the king-bolt 8, whereupon the front of the vehicle can be raised so as to leave the auxiliary axle 17 and axle 1 detached from the fifth wheel and the king-bolt 8.

One great advantage resulting from forming the wheel 6 with a smaller diameter than the wheel 4 resides in the fact that more space is left between the wheel 6 and the back wheel (not shown) on the same side of the vehicle with said wheel 6, so as to allow a person to get in and out of the vehicle without rubbing against said wheel, and, also, to permit easy access to the front of the vehicle, in order to place articles into or remove same from the front part of the vehicle, either from the front over the dashboard or from the side between the wheel 6 and the rear wheel in back of same. Further, by reason of forming wheels 6 with a smaller diameter than wheel 4, said wheels will travel substantially abreast of each other, instead of wheel 4 traveling in advance of the wheel 6 as is usually the case when both wheels are the same size. In practice, it has been found that, for this purpose, the best results are obtained when the ratio between the diameter of wheel 6 and the diameter of wheel 4 is the same as the ratio between the gage of said wheels and the total length of the axle 1, i. e., the gage of said wheels plus the extension on the axle 1. For example, if the ratio of the gage of the wheels 4 and 6 to the total length of the axle 1 is four to five, then the ratio of the diameter of wheel 6 to the diameter of the wheel 4 is also, four to five, i. e., the wheel 6 is formed with a diameter four-fifths as large as the diameter of wheel 4. It is, also, preferable that the spokes of the wheel 4 shall be arranged in staggered relation, somewhat similar to a bicycle wheel, while the wheel 6 is formed like an ordinary carriage wheel.

I claim:

In combination with the front axle of a vehicle having a relatively smaller wheel at one end than at the opposite end thereof the end of the axle having the larger wheel extended beyond the latter, a pair of shafts, one of said shafts being attached to the said axle extension and the other being attached to the axle at a point between the wheels, and means adjacent the smaller wheel to counterbalance the axle, said smaller wheel acting to compensate for the inequality of the lines of force exerted by the draft animal in drawing the vehicle so that both wheels will travel substantially abreast of each other.

In testimony whereof I hereunto affix my signature in the presence of two witnesses.

HENRY GOOSENS.

Witnesses:
  WALTER C. GUELS,
  GEORGE G. ANDERSON.

---

Copies of this patent may be obtained for five cents each, by addressing the "Commissioner of Patents, Washington, D. C."